(12) United States Patent
Lu (10) Patent No.: US 10,302,244 B2
(45) Date of Patent: May 28, 2019

(54) MULTI-PURPOSE CAMERA STAND (71) Applicant: Ningbo Nest E-commerce Co., Ltd., Ningbo, Zhejiang (CN)

(72) Inventor: Qi Lu, Zhejiang (CN)

(73) Assignee: Ningbo Nest E-Commerce Co., Ltd., Ningbo (CN)

( * ) Notice: Subject to any disclaimer, the term of this patent is extended or adjusted under 35 U.S.C. 154(b) by 0 days.

(21) Appl. No.: 15/856,382

(22) Filed: Dec. 28, 2017

(65) Prior Publication Data

US 2019/0128469 A1 May 2, 2019

(30) Foreign Application Priority Data

Oct. 31, 2017 (CN) .......................... 2017 1 1046907
Oct. 31, 2017 (CN) ...................... 2017 2 1427594 U (51) Int. Cl.
| | |
|---|---|
| *F16M 11/14* | (2006.01) |
| *F16M 11/24* | (2006.01) |
| *F16M 11/06* | (2006.01) |
| *F16M 11/28* | (2006.01) |
| *F16B 1/00* | (2006.01) |
| *G03B 17/56* | (2006.01) |
| *F16M 11/04* | (2006.01) |

(52) U.S. Cl.
CPC ............... *F16M 11/14* (2013.01); *F16B 1/00* (2013.01); *F16M 11/041* (2013.01); *F16M 11/06* (2013.01); *F16M 11/242* (2013.01); *F16M 11/28* (2013.01); *G03B 17/561* (2013.01); *F16B 2001/0035* (2013.01); *F16M 2200/022* (2013.01)

(58) Field of Classification Search
None
See application file for complete search history.

(56) References Cited

U.S. PATENT DOCUMENTS

| | | | | |
|---|---|---|---|---|
| 9,229,299 | B1* | 1/2016 | Morlon | G03B 17/561 |
| 9,298,066 | B1* | 3/2016 | Fan | G03B 17/561 |
| 9,661,197 | B2* | 5/2017 | Clearman | G03B 17/561 |
| 2008/0267613 | A1* | 10/2008 | Darrow | F16M 11/041 |
| | | | | 396/428 |
| 2011/0015647 | A1* | 1/2011 | Salisbury, Jr. | B25J 17/0275 |
| | | | | 606/130 |

(Continued)

*Primary Examiner* — Clayton E. LaBalle
*Assistant Examiner* — Dennis Hancock
(74) *Attorney, Agent, or Firm* — McDonnell Boehnen Hulbert & Berghoff LLP (57) ABSTRACT

A multi-purpose camera stand includes a lower tube, an upper tube sheathed on the lower tube, a multi-stage telescopic rod installed into the lower tube, and a mounting stand fixed to the multi-stage telescopic rod. A camera equipment is installed onto the mounting stand, and three legs are hinged to the bottom of the lower tube. After the three legs are folded, a first accommodating space for accommodating the multi-stage telescopic rod is formed, and a second accommodating space for accommodating the stand is formed in the upper tube. When the camera stand is folded, the telescopic rod is accommodated into the first accommodating space, and the mounting stand is accommodated into the second accommodating space to reduce the storage volume of the camera stand and facilitate storage and carry. In addition, the mounting stand can be rotated in different directions to fit the use of different occasions.

5 Claims, 9 Drawing Sheets (56) References Cited

U.S. PATENT DOCUMENTS

| | | | |
|---|---|---|---|
| 2015/0076184 A1* | 3/2015 | Achenbach | G03B 17/561 224/181 |
| 2015/0103236 A1* | 4/2015 | Woodman | F16M 11/00 348/373 |
| 2016/0259374 A1* | 9/2016 | Breiwa | H02J 50/10 |
| 2017/0114955 A1* | 4/2017 | Mao | F16M 13/06 |
| 2017/0192344 A1* | 7/2017 | Chi | G03B 17/561 |

* cited by examiner

MULTI-PURPOSE CAMERA STAND

FIELD OF INVENTION

The present disclosure relates to a camera stand, in particular to a multi-purpose camera stand.

BACKGROUND OF INVENTION

1. Description of the Related Art

In recent years, the industry of communications grows rapidly and the scope of applications of electronic products becomes increasingly broader. Regardless of work, education, or recreation, electronic products are used extensively. Among these electronic products, mobile phones have become a necessary item for our daily life. As Smartphone blooms, more and more functions are integrated into the mobile phones. Wherein, the camera function is one of the mostly used functions in addition to the daily communication function. To shoot high-quality photos, a camera stand is required.

A conventional camera stand for mobile phones generally comprises a telescopic rod and a mounting platform installed onto the telescopic rod, and the camera stand of this structure is not suitable for the use of a general camera. If such camera stand is applied to a camera, it is necessary to install a tripod to the stand for the support. The telescopic rod is installed directly to the top of the tripod. However, the camera stand of this structure occupies much area and is inconvenient to store and carry. In addition, the conventional camera stand for mobile phones is fixed by clips, and the camera stand of this structure has the drawbacks of uneasy installation/uninstallation and easy damage to the mobile phone due to loose connections.

2. Summary of the Invention

Problem to be Solved

It is a primary objective of the present disclosure to overcome the aforementioned drawbacks of the prior art by providing a multi-purpose camera stand with the feature of convenient storage and carry and capable of supporting and adjusting the stand with a wide angle.

Technical Solution

To achieve the aforementioned and other objectives, the present disclosure provides a multi-purpose camera stand comprising: a lower tube, an upper tube sheathed on the top of the lower tube, a multi-stage telescopic rod installed into the lower tube, and a mounting stand fixed to the top of the multi-stage telescopic rod, wherein a camera equipment is installed onto the mounting stand, and three legs are uniformly hinged at the bottom of the lower tube, and after the three legs are folded, a first accommodating space for accommodating the multi-stage telescopic rod is formed, and a second accommodating space for accommodating the stand is formed in the upper tube.

Wherein, the mounting stand comprises a holder fixed to the multi-stage telescopic rod, a first hinge seat sheathed on the holder, a second hinge seat hinged at the first hinge seat, and a mounting platform installed onto the second hinge seat, and the first hinge seat is rotatable about the axis of the holder.

Wherein, a damping mechanism is installed between the first hinge seat and the holder, and the damping mechanism further comprises a rolling slot, a spring and a ball abutting against the rolling slot and rolling along the rolling slot, and the rolling slot is integrally formed at the circumference of a guide column of the first hinge seat, and the spring and the ball are sequentially installed onto installation slots of the holder, and the rolling slot comes with a plural quantity, and the rolling slots are sequentially formed at the circumference of the guide column.

Wherein, a positioning slot is disposed between two adjacent rolling slots, and the ball abuts against the positioning slot.

Wherein, a ball joint is disposed between the mounting platform and the second hinge seat and fixed onto the second hinge seat, and the mounting platform is ball-hinged at the ball joint.

Wherein, the mounting platform has a magnet installed thereon, and the ball joint is a magnetic member, and the magnet and the ball joint attract each other.

Wherein, a damping member is installed between the magnet and the ball joint.

Wherein, a magnetic plate is installed onto the camera equipment, and the magnetic plate and the magnet attract each other.

Wherein, the upper tube has a mounting hole formed thereon for installing a controller, and both sides of the controller have a groove, and the inner wall of the mounting hole has a boos latched into the groove.

Wherein, the lower tube has a platen fixed to the bottom thereof, and abutted against a hinge shaft of the leg.

Beneficial Effects

Compared with the prior art, the camera stand of the present disclosure can be folded, so that the telescopic rod is accommodated into the first accommodating space, and the mounting stand is accommodated into the second accommodating space to reduce the storage volume of the camera stand, so as to facilitate its storage and carry. In addition, the mounting stand can be rotated in different directions to fit the use for different occasions, and the fixing method of the magnet onto the camera equipment facilitates the installation conveniently, quickly and securely.

BRIEF DESCRIPTION OF THE DRAWINGS

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

DESCRIPTION OF THE PREFERRED EMBODIMENTS

The objectives, features, and advantages of the present disclosure are described and illustrated together with the related drawings as follows.

Figure 1:
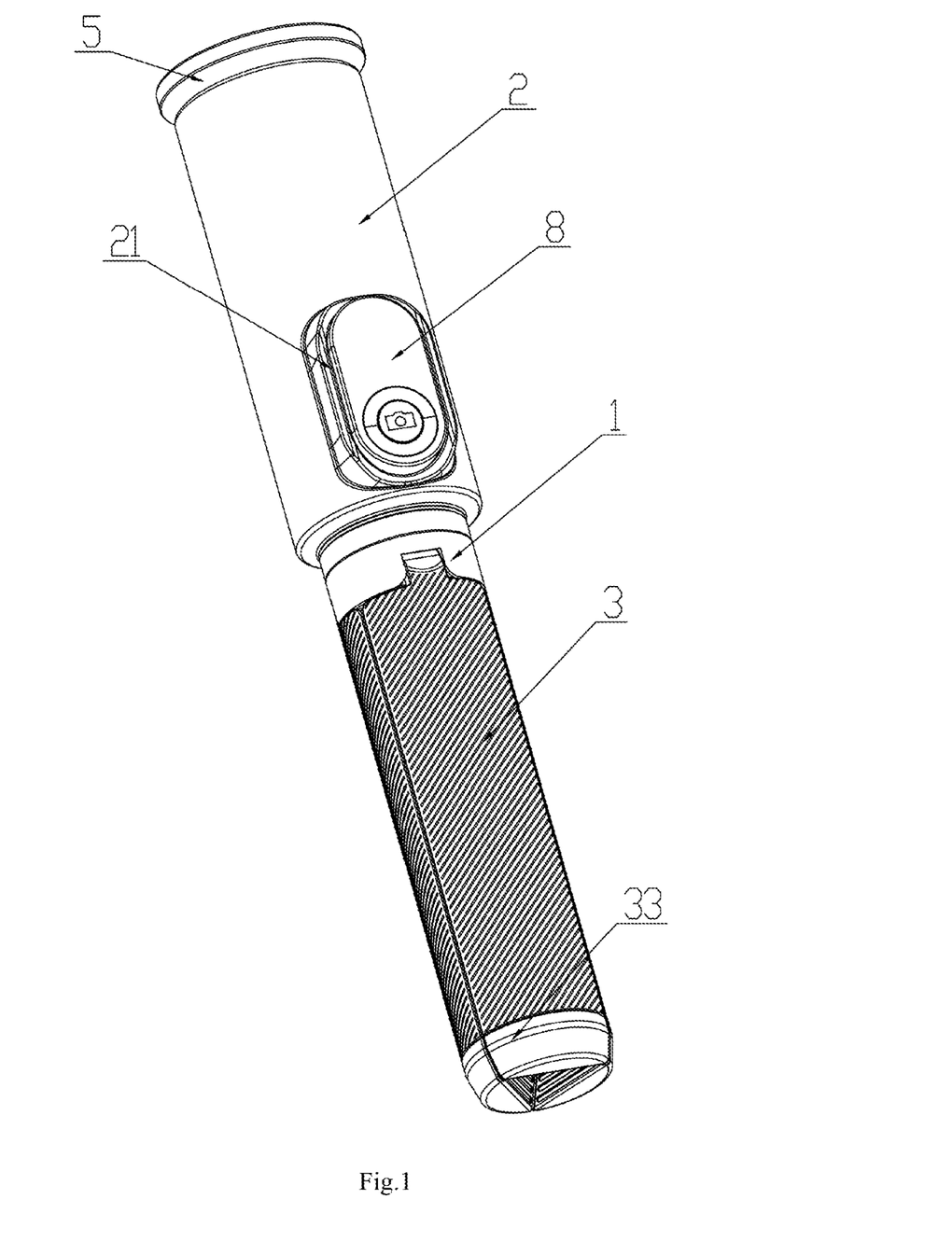
FIG. 1 is a perspective view of a multi-purpose camera stand in accordance with this disclosure, showing that the camera stand is folded.
Figure 2:
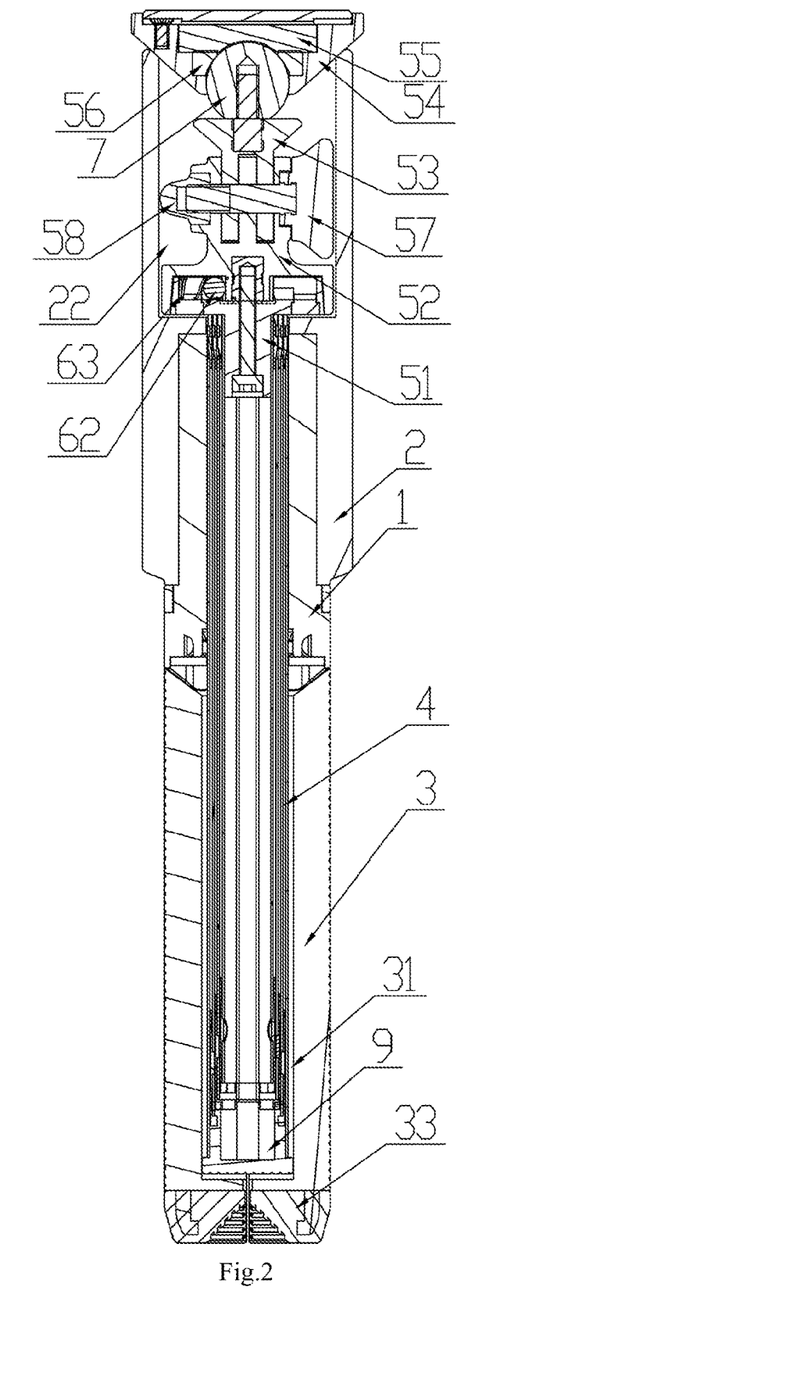
FIG. 2 is a cross-sectional view of a multi-purpose camera stand in accordance with this disclosure, showing that the camera stand is folded.
Figure 3:
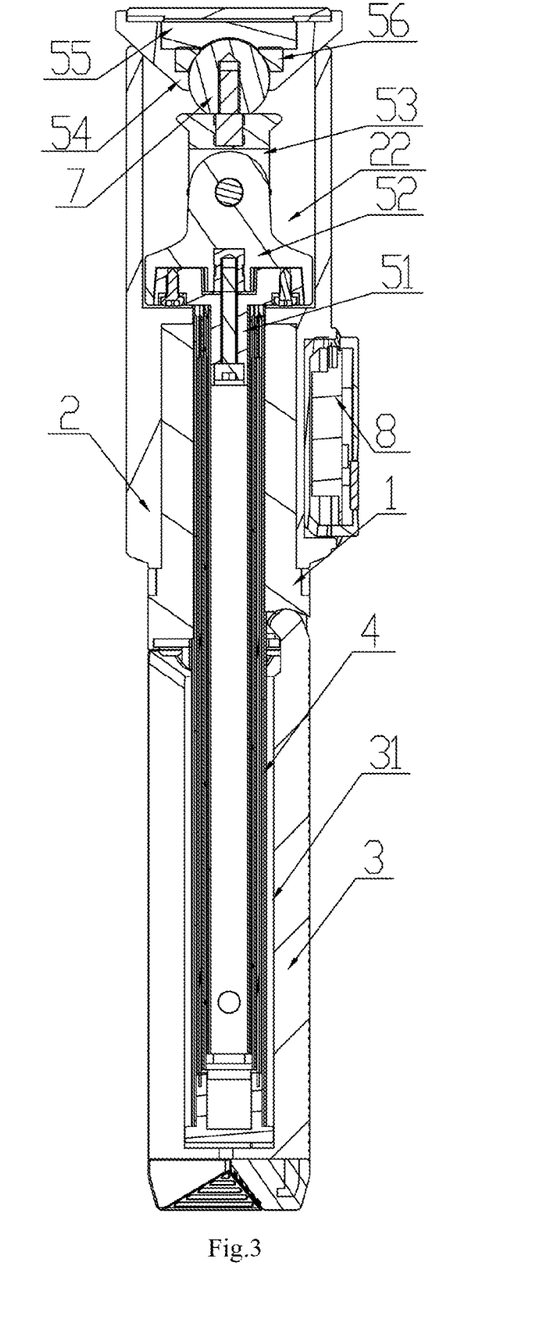
FIG. 3 is another cross-sectional view of a multi-purpose camera stand in accordance with this disclosure, showing that the camera stand is folded.
Figure 4:
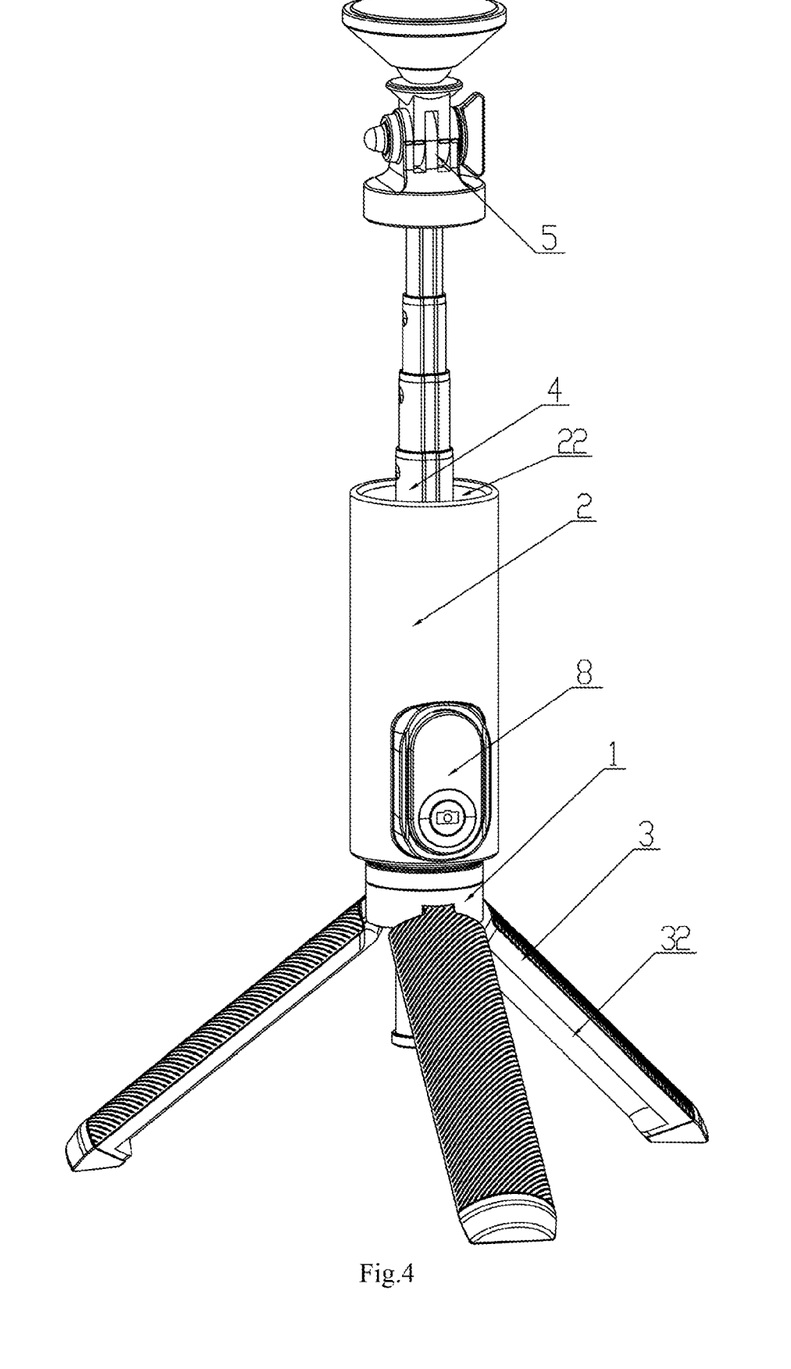
FIG. 4 is a perspective view of a multi-purpose camera stand in accordance with this disclosure, showing that the camera stand is unfolded.
Figure 5:
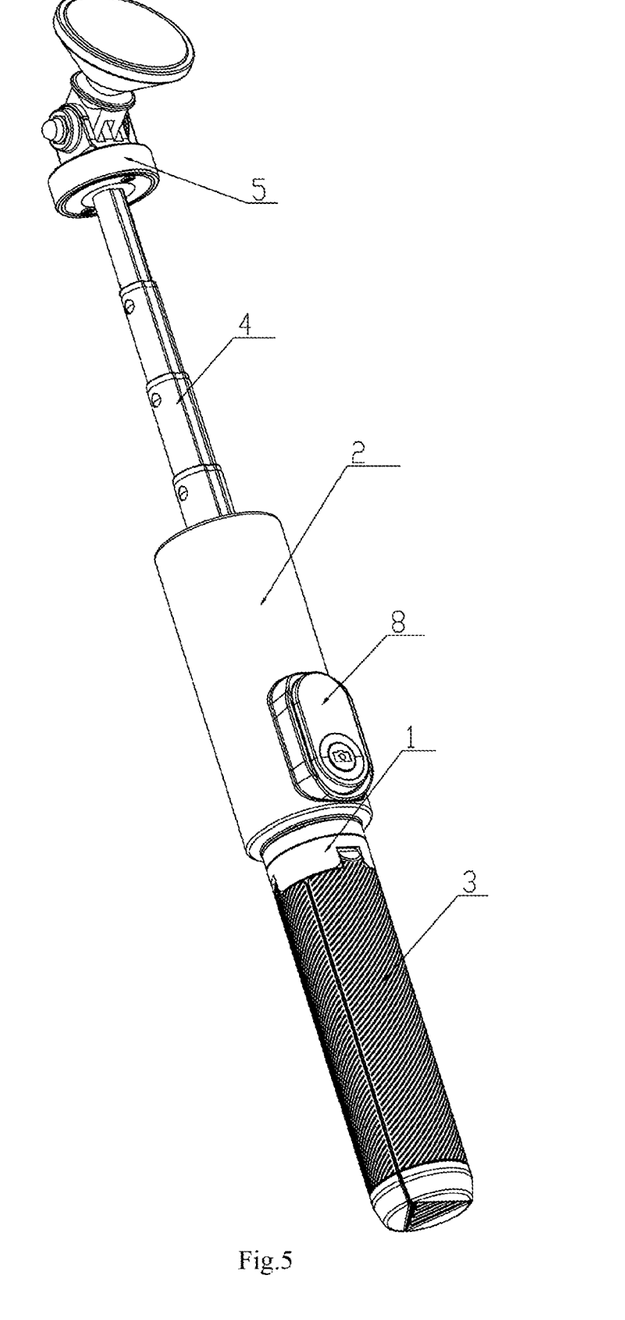
FIG. 5 is a perspective view of a multi-purpose camera stand in accordance with this disclosure, showing that the camera stand is unfolded to another status.

With reference to FIGS. 1, 4 and 5 for the structure of a multi-purpose camera stand in accordance with the present disclosure and FIGS. 2 and 3 for the cross-sectional views of the multi-purpose camera stand respectively, the multi-purpose camera stand comprises a lower tube 1, an upper tube 2 sheathed onto the top of the lower tube 1, a multi-stage telescopic rod 4 installed in the lower tube 1, and a mounting stand 5 fixed to the top of the multi-stage telescopic rod 4, wherein a camera equipment is installed onto the mounting stand 5, and three legs 3 are uniformly hinged at the bottom of the lower tube. After the three legs 3 are folded, a first accommodating space 31 for accommodating the multi-stage telescopic rod 4 is formed therein, and the upper tube 2 has a second accommodating space 22 formed therein for accommodating the stand 5. When not in use, the telescopic rod is extended downwardly into the first accommodating space, and the mounting stand is accommodated into the second accommodating space to reduce the storage volume of the camera stand, so as to facilitate its storage and carry.

The upper tube 2 is made of a soft material such as silicone or a hard material such as plastic. The upper tube 2 not just provides a storage effect only, but also provides a specific protection effect to the mounting stand to protect the mounting stand in the upper tube from being damaged.

Figure 9:
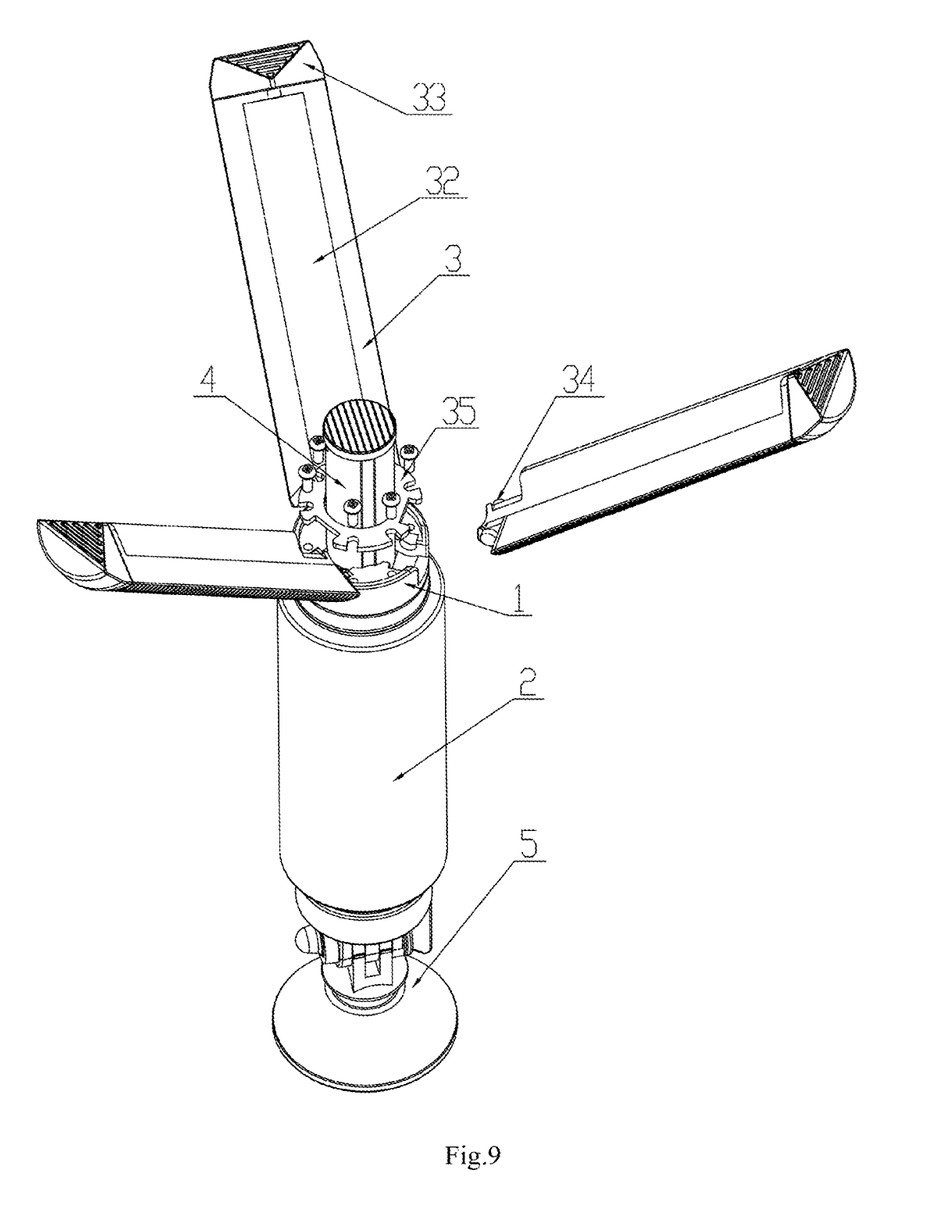
FIG. 9 is a partial exploded view of a leg of a multi-purpose camera stand in accordance with this disclosure.

In FIG. 9, a hinge shaft 34 is integrally formed with the upper end of the legs 3 and installed onto the lower tube 1, and a platen 35 is fixed to the bottom of the lower tube 1 by screws, and the platen 35 abuts against the hinge shaft 34 to provide a specific damping force to the rotation of the legs, so as to facilitate the control of the rotating angle of the legs and prevent the shaking of the legs.

A fan-shaped slot 32 is formed on an inner side of each leg 3, and when the three legs are folded, the 3 fan-shaped slots are combined to form the first accommodating space which is a circular hole, and the outermost side of a telescopic tube of the telescopic rod has a sleeve 9 configured to be correspond to the circular hole.

The bottom of each leg 3 has a footer 33 provided for improving the stability of supporting the legs, and the outer wall of each leg 3 has a plurality of friction slots formed thereon for improving friction to facilitate users to hold the legs 3.

Figure 6:
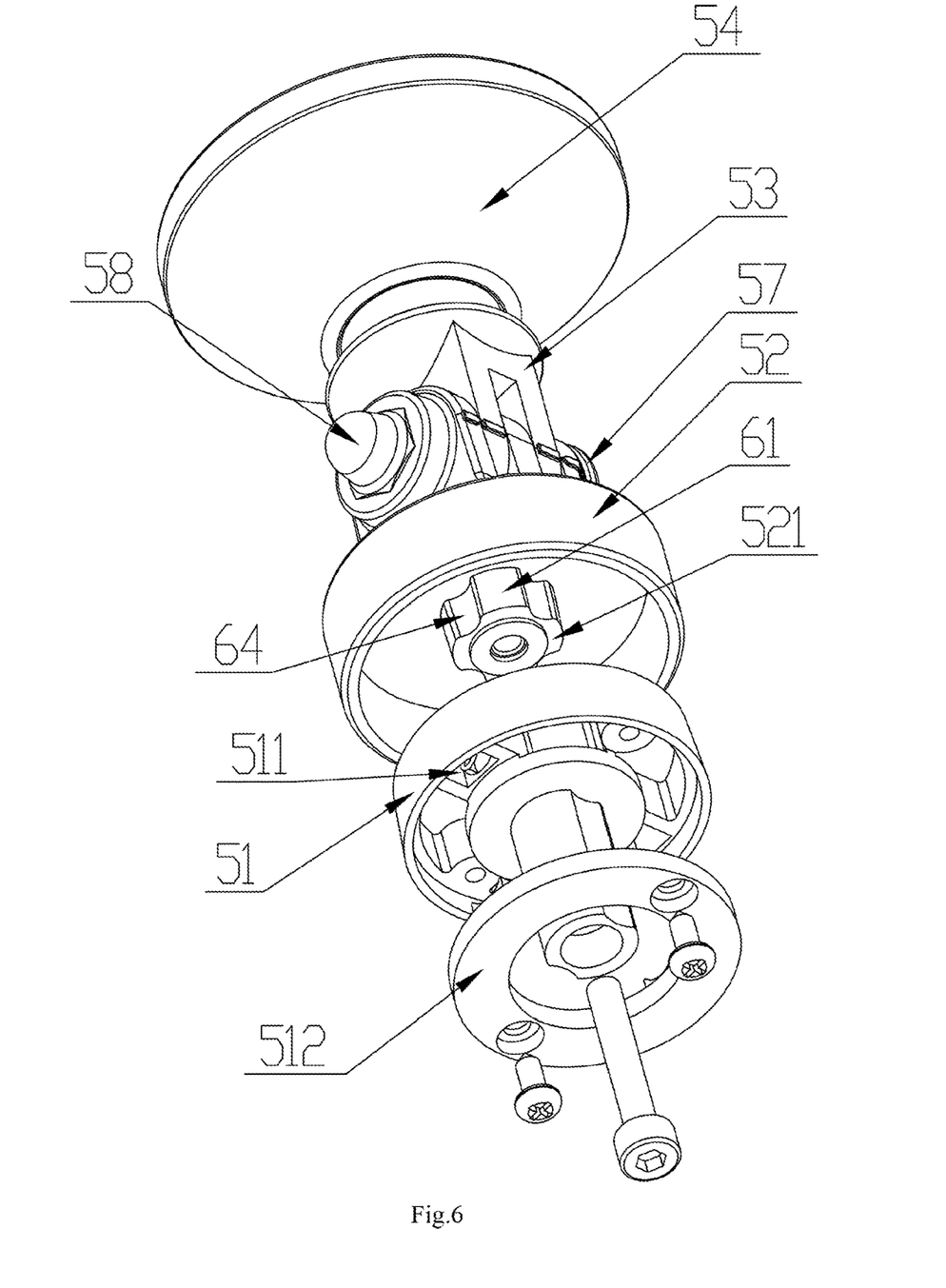
FIG. 6 is an exploded view of a mounting stand of a multi-purpose camera stand in accordance with this disclosure.
Figure 7:
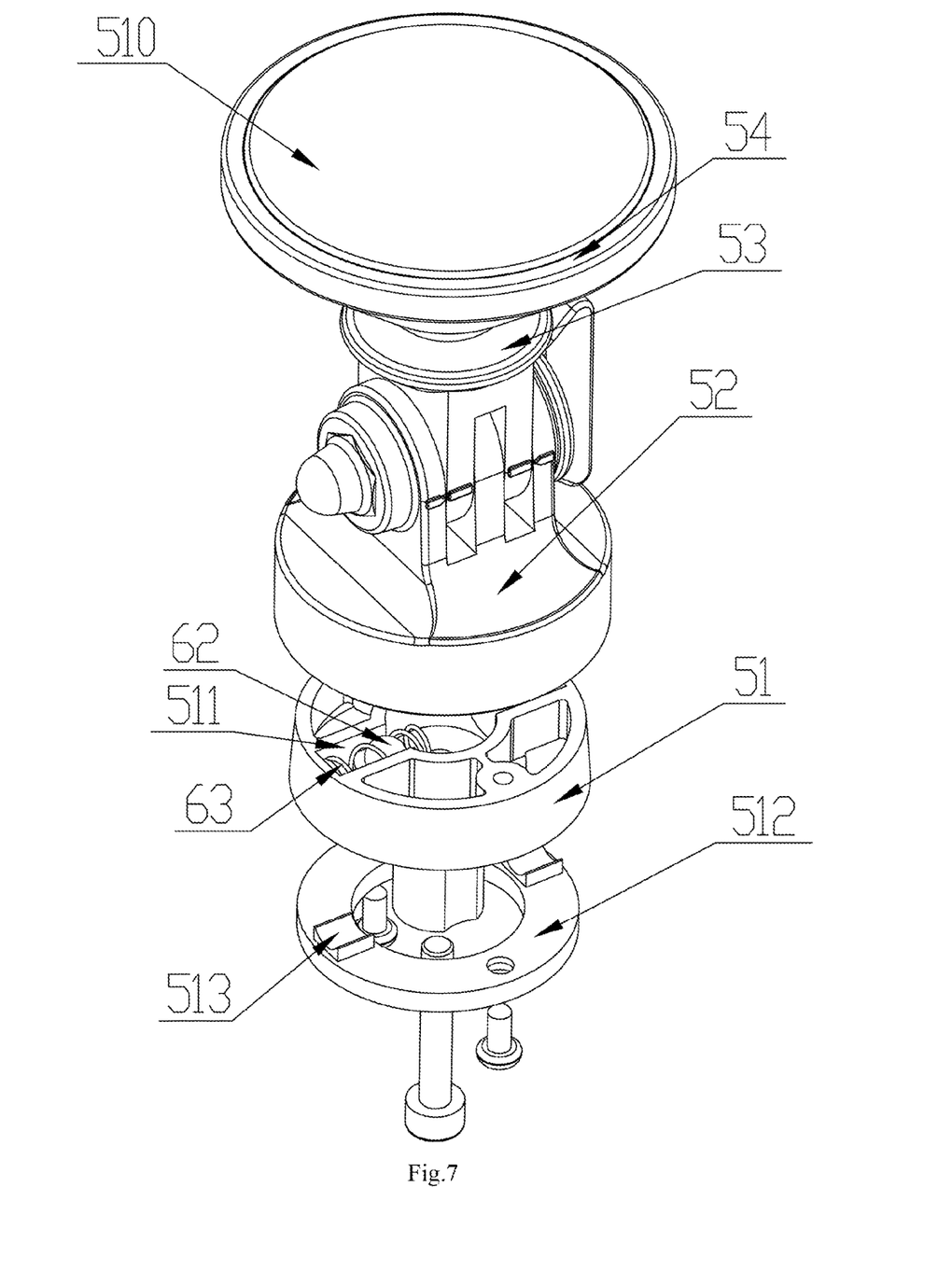
FIG. 7 is an exploded view of a mounting stand of a multi-purpose camera stand in accordance with this disclosure.

With reference to FIGS. 6 and 7 for the structure of the mounting stand 5, the mounting stand 5 comprises a holder 51 fixed to the multi-stage telescopic rod 4, a first hinge seat 52 sheathed on the holder 51, a second hinge seat 53 hinged at the first hinge seat 52, and a mounting platform 54 installed onto the second hinge seat 53, wherein the first hinge seat 52 is rotatable bout the axis of the holder 51. Therefore, the mounting stand can be rotated in 360 degrees in the horizontal direction and in 180 degrees in the vertical direction, so that the camera stand is applicable for shooting different scenes and provide much convenience to users.

The first hinge seat 52 and the second hinge seat 53 are coupled by a hinge screw 57 and a nut 58, and the nut can be tightened ro loosened to adjust the damping force for the rotation of the mounting platform and prevent the mounting platform from rotating freely, so as to improve the rotation precision and the shooting quality.

The second hinge seat and the mounting platform installed onto the second hinge seat can be replaced by other mounting platforms for the use of different camera equipments.

The holder 51 is fixed onto the telescopic rod installed on the innermost side of the multi-stage telescopic rod 4.

A damping mechanism is installed between the first hinge seat 52 and the holder 51, and the damping mechanism comprises a rolling slot 61, a spring 63, and a ball 62 abutting against the rolling slot 61 and rolling along the rolling slot 61, and the rolling slot 61 is integrally formed at the circumference of the guide column 521 of the first hinge seat 52, and the spring 63 and the ball 62 are installed sequentially onto the installation slot 511 of the holder 51. The rolling slot 61 comes with a plurality quantity, and they are arc slots. The rolling slots 61 are sequentially formed at the circumference of the guide column. When the mounting stand is rotated in the horizontal direction, there is a specific damping force to ensure the precison precision of the rotating angle of the mounting stand and improve the shooting quality.

A positioning slot 64 is installed between two adjacent rolling slots 61, and the ball 62 abuts against the positioning slot 64, and round corners are adopted for the positioning slot 64 and adjacent rolling slots to facilitate the rolling of the ball, so as to achieve the positioning effect, prevent the mounting stand from shaking, and improving the shooting quality.

There may be four rolling slots 61, four positioning slots 64, one or more balls and one or more springs. For several balls and springs, they are distributed uniformly.

A positioning plate 512 is fixed to the bottom of the holder, and a positioning platform 513 is integrally formed at the top of the positioning plate 512 and extended deeply into the installation slot 511. The positioning platform 513 has an arc surface, and the ball is installed onto the arc surface to facilitate the rolling of the ball and provide a positioning effect to the spring and the ball.

Figure 8:
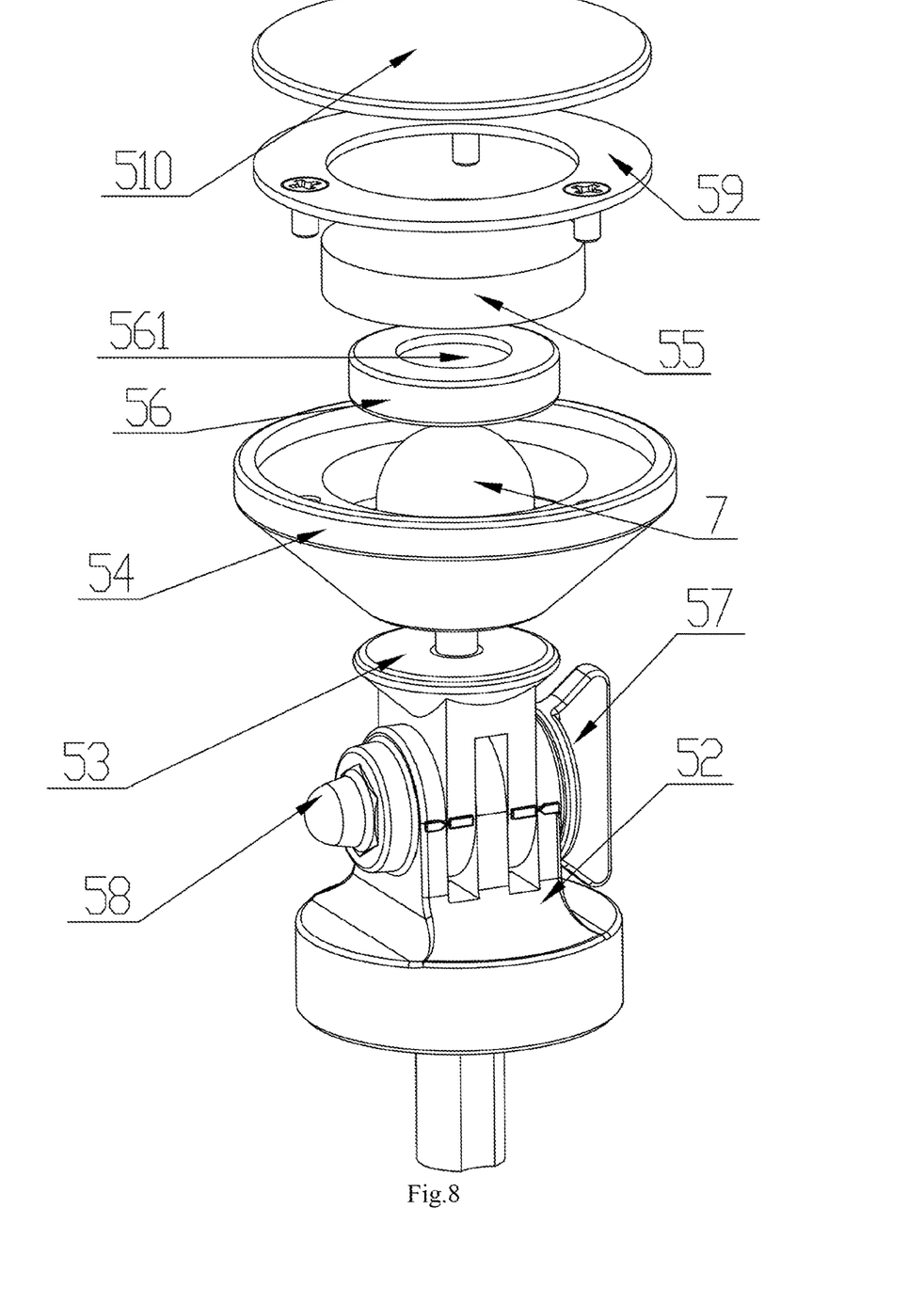
FIG. 8 is an exploded view of a mounting stand of a multi-purpose camera stand in accordance with this disclosure.

In FIG. 8, a ball joint 7 is disposed between the mounting platform 54 and the second hinge seat 53 and fixed onto the second hinge seat 53, and the mounting platform 54 is ball-hinged at the ball joint 7, so that the mounting platform can be rotated in different angles to fit the shooting from different positions and different angles.

The mounting platform 54 has a magnet 55 installed thereon, and the ball joint 7 is a magnetic member, and the magnet 55 and the ball joint 7 attract each other, so that the mounting platform produces a specific damping force during the rotation to ensure the precision of the rotation precision, prevent the mounting platform from shaking freely, and improve the shooting quality.

A damping member 56 is installed between the magnet 55 and the ball joint 7, and the magnet 55 and the damping member 56 are fixed onto the mounting platform 54 by a fastener. The bottom of the damping member 56 has an arc hole 561 configured to be correspond to the ball joint 7 and attached onto the ball joint 7. The damping member may be made of rubber, and it provides a specific damping effect to the rotation of the mounting platform, ensures the precision of the rotation of the platform, avoids the mounting platform from shaking freely, and improving the shooting quality.

The camera equipment has a magnetic plate (not shown in the figure) installed thereon, and the attraction force between the magnet and the magnetic plate is used to install the camera equipment directly onto the mounting platform, so as to achieve the effect of installing and uninstalling the camera equipment quickly and securely.

A rubber pad 510 is fixed to the top of the mounting platform 54 for improving friction, ensuring the secured connection of the camera equipment with the mounting platform.

The upper tube 2 has a mounting hole 21 formed thereon for installing the controller 8, both sides of the controller 8 have a groove (not shown in the figure), and the inner wall of the mounting hole 21 has a boss (not shown in the figure) latched into the groove, and the controller and the camera equipment are electrically coupled to control the camera equipment to complete shooting, and the controller and the camera equipment may be connected via a cable connection or a wireless connection such as the Bluetooth connection.

While the disclosure has been described by means of specific embodiments, numerous modifications and variations could be made thereto by those skilled in the art without departing from the scope and spirit of the disclosure set forth in the claims.

What is claimed is:

1. A multi-purpose camera stand, comprising: a lower tube (1), an upper tube (2) sheathed on the top of the lower tube (1), a multi-stage telescopic rod (4) installed into the lower tube (1), and a mounting stand (5) fixed to the top of the multi-stage telescopic rod (4), wherein a camera equipment is installed onto the mounting stand (5), and three legs (3) are uniformly hinged at the bottom of the lower tube (1), and after the three legs (3) are folded, a first accommodating space (31) for accommodating the multi-stage telescopic rod (4) is formed, and a second accommodating space (22) for accommodating the stand (5) is formed in the upper tube (2); wherein the mounting stand (5) comprises a holder (51) fixed to the multi-stage telescopic rod (4), a first hinge seat (52) sheathed on the holder (51), a second hinge seat (53) hinged at the first hinge seat (52), and a mounting platform (54) installed onto the second hinge seat (53), and the first hinge seat (52) is rotatable about the axis of the holder (51); and wherein the multi-purpose camera stand further comprises a damping mechanism installed between the first hinge seat (52) and the holder (51), wherein the damping mechanism further comprises a rolling slot (61), a spring (63) and a ball (62) abutting against the rolling slot (61) and rolling along the rolling slot (61), and the rolling slot (61) being integrally formed at the circumference of a guide column (521) of the first hinge seat (52), and the spring (63) and the ball (62) being sequentially installed onto installation slots (511) of the holder (51), and the rolling slot (61) coming with a plural quantity, and the plurality of rolling slots (61) being sequentially formed at the circumference of the guide column (521).

2. The multi-purpose camera stand of claim 1, further comprising a positioning slot (64) disposed between two adjacent rolling slots (61), and the ball (62) abutting against the positioning slot (64).

3. The multi-purpose camera stand of claim 1, further comprising a ball joint (7) disposed between the mounting platform (54) and the second hinge seat (53) and fixed onto the second hinge seat (53), and the mounting platform (54) being ball-hinged at the ball joint (7).

4. The multi-purpose camera stand of claim 3, wherein the mounting platform (54) has a magnet (55) installed thereon, and the ball joint (7) is a magnetic member, and the magnet (55) and the ball joint (7) attract each other.

5. The multi-purpose camera stand of claim 4, further comprising a damping member (56) installed between the magnet (55) and the ball joint (7).

\* \* \* \* \*